United States Patent
Bates et al.

(10) Patent No.: US 8,627,226 B2
(45) Date of Patent: *Jan. 7, 2014

(54) DYNAMIC WEB PAGE ARRANGEMENT

(75) Inventors: Cary Lee Bates, Rochester, MN (US); Mahdad Majd, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 848 days.

This patent is subject to a terminal disclaimer.

(21) Appl. No.: 12/177,652

(22) Filed: Jul. 22, 2008

(65) Prior Publication Data

US 2008/0282176 A1  Nov. 13, 2008

Related U.S. Application Data

(63) Continuation of application No. 09/574,157, filed on May 18, 2000, now abandoned.

(51) Int. Cl.
*G06F 3/048* (2013.01)

(52) U.S. Cl.
USPC ........... 715/785; 715/248; 715/253; 715/784; 715/788; 715/789

(58) Field of Classification Search
USPC .................. 707/3, 5; 715/738, 200, 205–210, 715/243–253, 705–708, 760, 764, 765, 767, 715/781, 784–789
See application file for complete search history.

(56) References Cited

U.S. PATENT DOCUMENTS

| | | | | |
|---|---|---|---|---|
| 5,799,292 | A | | 8/1998 | Hekmatpour |
| 5,838,326 | A | * | 11/1998 | Card et al. ............. 715/775 |
| 5,847,709 | A | * | 12/1998 | Card et al. ............. 715/850 |
| 5,848,396 | A | | 12/1998 | Gerace |
| 5,867,678 | A | | 2/1999 | Amro et al. |
| 5,973,663 | A | | 10/1999 | Bates et al. |
| 6,012,098 | A | | 1/2000 | Bayeh et al. |
| 6,069,625 | A | | 5/2000 | Nielsen |
| 6,078,916 | A | | 6/2000 | Culliss |
| 6,088,032 | A | * | 7/2000 | Mackinlay ............. 715/848 |
| 6,154,205 | A | | 11/2000 | Carroll et al. |
| 6,182,133 | B1 | * | 1/2001 | Horvitz ............. 709/223 |

(Continued)

OTHER PUBLICATIONS

Stefan Muenz, Selfhtml, Version 7.0, Apr. 27, 1998, with machine translation of selected sections from http://web.archive.org/web/20020808101148/selfaktuell.teamone.de/archiv/doku/7.0/selfhtml.htm.

(Continued)

*Primary Examiner* — Enrique Iturralde
(74) *Attorney, Agent, or Firm* — Patterson & Sheridan LLP

(57) ABSTRACT

A browser renders a page for display according to user habits. When a user interacts with a page associated with a network address, an entry is made in a file that associates the element on the page of the user interaction with the network address. When the page is visited again, the file is checked to see if any entry exists. If an entry exists and the stored user interaction is still relevant for that page, the page is rendered so that the location the user interacted with is provided at the top of the display, or the element is re-arranged, as in the case of a table, or both re-positioning and re-arranging occurs. Such page rendering reduces the need for the user to scroll through the page to view the desired information.

20 Claims, 9 Drawing Sheets

(56) References Cited

U.S. PATENT DOCUMENTS

| | | |
|---|---|---|
| 6,337,697 B1 * | 1/2002 | Kim .............................. 715/784 |
| 6,338,096 B1 | 1/2002 | Ukelson |
| 6,401,094 B1 | 6/2002 | Stemp et al. |
| 6,412,012 B1 | 6/2002 | Bieganski et al. |
| 6,486,892 B1 | 11/2002 | Stern |
| 6,487,541 B1 | 11/2002 | Aggarwal et al. |
| 6,489,968 B1 | 12/2002 | Ortega et al. |
| 6,523,022 B1 * | 2/2003 | Hobbs .................................. 1/1 |
| 6,597,314 B1 * | 7/2003 | Beezer et al. ................. 715/812 |
| 6,597,379 B1 | 7/2003 | Morris et al. |
| 6,665,659 B1 * | 12/2003 | Logan ................................... 1/1 |
| 6,734,886 B1 | 5/2004 | Hagan et al. |
| 6,750,850 B2 | 6/2004 | O'Leary |
| 6,785,671 B1 | 8/2004 | Bailey et al. |
| 6,976,210 B1 | 12/2005 | Silva et al. |
| 6,996,784 B2 | 2/2006 | Haitani et al. |
| 7,107,226 B1 | 9/2006 | Cassidy et al. |
| 7,653,614 B2 | 1/2010 | Smith |
| 2003/0053420 A1 | 3/2003 | Duckett et al. |
| 2003/0065770 A1 | 4/2003 | Davis et al. |
| 2006/0136589 A1 | 6/2006 | Konig et al. |
| 2008/0134044 A1 | 6/2008 | Bates et al. |
| 2008/0134064 A1 | 6/2008 | Bates et al. |

OTHER PUBLICATIONS

Office Action history of U.S. Appl. No. 12/016,074, dates ranging from Jun. 9, 2010 to Feb. 24, 2011.
Office Action history of U.S. Appl. No. 09/574,157, dates ranging from Aug. 13, 2003 to May 7, 2009.
Office Action History of U.S. Appl. No. 12/016,063, dates ranging from Jun. 16, 2010 to Feb. 16, 2011.
Bates, Cary L. et al., US Patent Application entitled "Method and Apparatus for Dynamic Web Page Arrangement", U.S. Appl. No. 09/574,157, filed May 18, 2000.

* cited by examiner

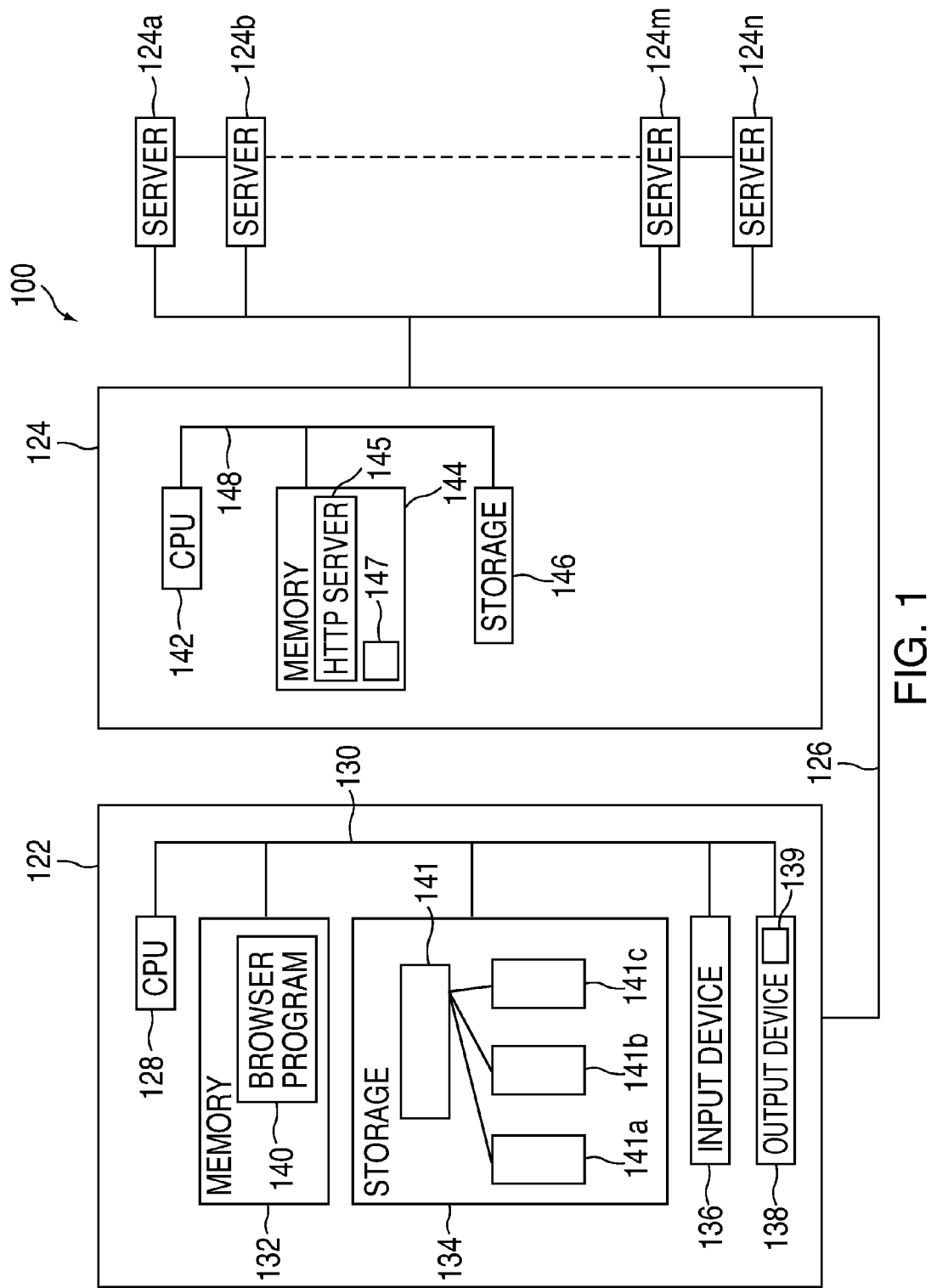

| IBM | 111 | chart | news |
|------|-------|-------|------|
| JMAR | 7 | chart | news |
| SUNW | 75 | chart | news |
| VCAI | 11 | chart | news |
| MTIC | 32 7/8 | chart | news |
| HWP | 104 1/2 | chart | news |
| INTC | 84 3/8 | chart | news |
| MSFT | 101 1/8 | chart | news |

FIG. 6a

| HWP | 104 1/2 | chart | news |
|------|-------|-------|------|
| INTC | 84 3/8 | chart | news |
| IBM | 111 | chart | news |
| SUNW | 75 | chart | news |

FIG. 6b

| SUNW | 75 | chart | news |
|------|-------|-------|------|
| VCAI | 11 | chart | news |
| MTIC | 32 7/8 | chart | news |
| MSFT | 101 1/8 | chart | news |
| JMAR | 7 | chart | news |

FIG. 6c

DYNAMIC WEB PAGE ARRANGEMENT

CROSS-REFERENCE TO RELATED APPLICATIONS

This is a continuation of U.S. patent application Ser. No. 09/574,157 filed May 18, 2000, now abandoned which is herein incorporated by reference in its entirety.

BACKGROUND OF THE INVENTION

1. Field of the Invention

The present invention relates to information systems. More particularly, the invention relates to a browser that renders a page to a display according to prior user activity on that page.

2. Background of the Related Art

Information systems, such as the Internet, provide users with access to a large amount of information. Many users of such systems employ a web browser or similar program to find the information they are interested in. Typically, the user selects, loads, and displays electronic documents, such as Hypertext Markup Language ("HTML") documents, utilizing software called a browser, which is typically stored in memory in the user's (client) computer. HTML documents displayed by the browser generally contain areas that, when selected by a user, cause the browser to load and display other HTML documents, allow the user to enter information, or enable other user interaction. A selectable area, such as a hypertext link, may be textual, graphic, or generally any designated area of a displayed HTML document. Hypertext links, for example, are associated with a network address, such as a Uniform Resource Locator ("URL"), of a destination HTML document that is loaded and displayed when the link is selected by the user.

One problem with electronic documents, such as HTML documents, is that the display type and the page formatting can affect the displayed output viewable by the user. HTML documents are typically displayed on any of a variety of display devices, such as Cathode Ray Tubes ("CRT's") or liquid crystal displays. Sometimes an entire HTML page can be displayed, other times the user might have to "scroll" the display, that is, select that portion of the page the user wants to view that is not currently shown, by providing input from a user input device. For example, an HTML page might be loaded so that the top of the page appears at the top of the display, with a bottom portion of the page not being shown.

The user can typically manipulate arrow keys, a mouse, scroll wheel or similar device to scroll down the page. Sometimes the width or length of the HTML page exceeds the display area, and a user might have to scroll across or down the screen to view the desired information. The need to scroll to the desired viewing area may be compounded when electronic documents designed for one type of display, such as a desk-top computer display, are viewed on a smaller display, such as the display of a cell phone, which may have only about 11 lines. Unfortunately, the user input devices provided with devices that have small displays are often more cumbersome to use than other scrolling devices, such as track balls or "mice" provided with desk-top systems.

Therefore, there is a need for an apparatus and a method for reducing or eliminating the need to scroll a page.

SUMMARY OF THE INVENTION

In one embodiment of the invention, a computer-readable, signal-bearing medium containing a program for rendering an electronic document to a display is provided. The program, when read and executed by a computer, gets an electronic address associated with the electronic document. The program then evaluates a data structure to determine if a user has interacted with the electronic document. The data structure contains at least an entry for a user interaction field on the electronic document. If the user has interacted with the electronic document, the program determines if the user interaction field exists on the electronic document. If the user interaction field exists on the electronic document, the program renders the electronic document to the display so that the user interaction field is viewable on the display.

In another embodiment another computer-readable, signal-bearing medium containing a program for rendering an electronic document to a display is provided. The program, when read and executed by a computer, gets an electronic address associated with the electronic document. Then the program determines if a first data structure includes a first user interaction type associated with the electronic document or a second user interaction type associated with the electronic document. If the first data structure includes the first user interaction type, the program determines if a first entry for the first user interaction type is present in a second data structure. If the first entry is not present in the second data structure, the program determines if a second entry for the second user interaction type is present in a third data structure. If the second entry is present, the program determines if a user interaction field associated the second entry exists on the electronic document. If the user interaction field exists on the electronic document, the program renders the electronic document to the display so that the user interaction field is viewable on the display.

In another embodiment, a method for rendering a document to be displayed on a networked display device is provided. The method retrieves an electronic document according to a network address. The method then determines if an entry associated with the electronic document exists in a data structure, the entry including a user interaction field. If the entry exists, the method determines if the user interaction field appears on the electronic document. If the user interaction field appears on the electronic document, the method renders a page to display the user interaction field in a viewable area of the networked display device.

In another embodiment, another method for rendering an electronic document to be displayed on a networked display device is provided. The method retrieves the electronic document according to a network address and then determines if a first entry associated with the electronic document exists in a data structure, the first entry including a first user interaction field and a first count. If the first entry exists in the data structure, the method determines if the first user interaction field appears on the electronic document. If the first user interaction field appears on the electronic document, the method moves the first user interaction field from a first current location on the electronic document to a viewable portion of the display. The method also determines if the data structure includes a second entry associated with the electronic document, the second entry including a second user interaction field and a second count. If the second entry exists in the data structure, the method determines if the second user interaction field appears on the electronic document. If the second user interaction field appears on the electronic document, the method moves the second user interaction field from a second current location on the page to the viewable portion of the display, wherein the second user interaction field is displayed above the first user interaction field if the second count is greater than the first count.

In another embodiment, a method for storing user interaction habits with an electronic document is provided. The method gets a first user interaction with the electronic document and a network address associated with the page. The method then determines if the first user interaction is a first user interaction type. If the first user interaction is the first user interaction type, the method gets electronic document field data associated with the first user interaction and stores the electronic document field data according to the first user interaction type and the network address. The method increments and stores a count associated with the first user interaction.

In another embodiment, a configurable client computer for use in a client-server computer system is provided. The client computer includes a display and a browser capable of rendering electronic documents to the display. The browser can access user habit data in association with electronic document address data. A renderer invoked by the browser is able to render a selected electronic document to the display according to the user habit data.

In another embodiment, a configurable client computer for use in a client-server computer system is provided. The client computer includes a display capable of displaying, at most, a first number of lines and a browser capable of rendering electronic documents to the display. The browser can access user habit data in association with page address data. A renderer evaluates the user habit data in a data file to render a selected electronic document to the display by rearranging elements on the selected electronic document according to the user habit data.

BRIEF DESCRIPTION OF THE DRAWINGS

The teachings of the present invention can be readily understood by considering the following detailed description in conjunction with the accompanying drawings, in which:

FIG. 1 is a simplified block diagram of a client-server computer system according to an embodiment of the present invention.

FIG. 6a is a simplified representation of a table of information and links as might be shown on a display of a networked device as a portion of an electronic document.

FIG. 6b is an exemplary table shown on a display of a networked device according to the operation of an embodiment of the present invention.

FIG. 6c is a portion of the exemplary table not displayed on networked device according to the operation of an embodiment of the present invention.

To facilitate understanding, identical reference numerals have been used, where possible, to designate identical elements that are common to the figures.

DETAILED DESCRIPTION OF THE PREFERRED EMBODIMENT

Figure 2A:
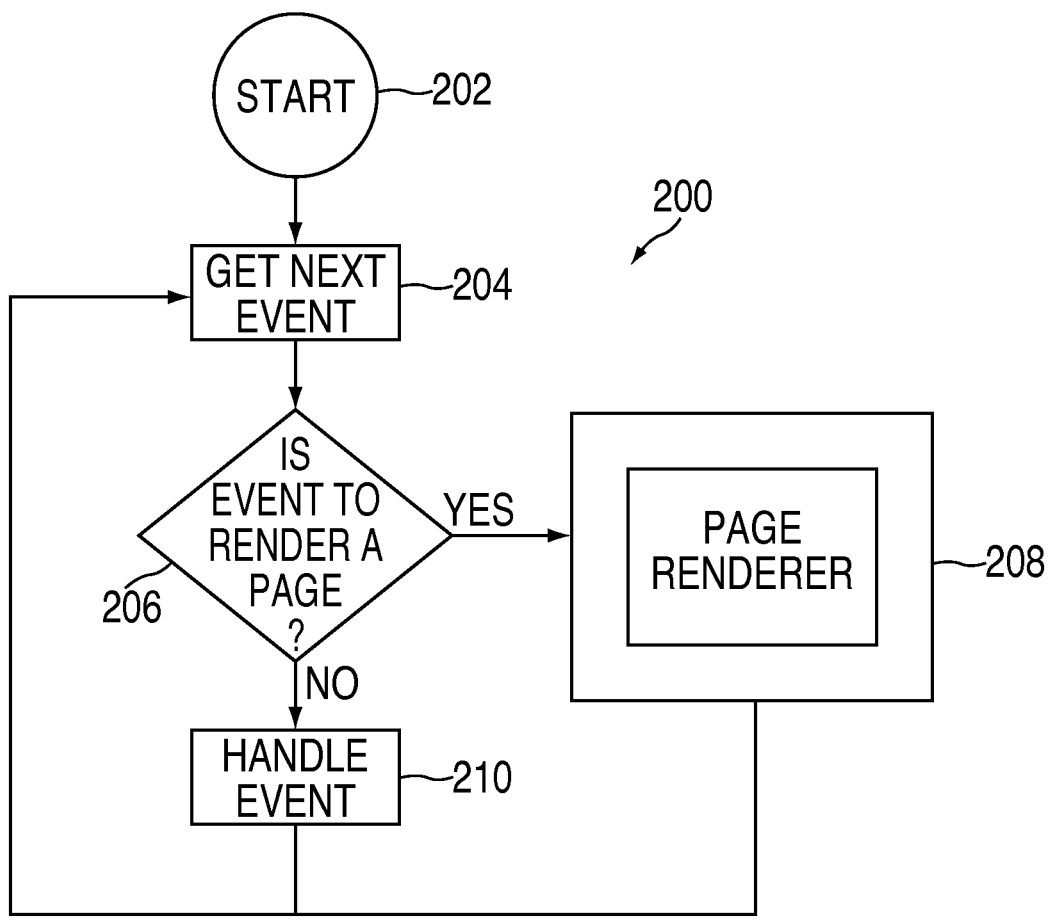
FIG. 2a is a simplified flow chart of a portion of a browser according to an embodiment of the present invention.

The present invention relates to adapting a displayed page according to user activity. A page is typically downloaded from a server computer ("server") to a client computer ("client"). A browser in the client computer renders the page according to information received from the server. Page information can be sent from the server to the client in a variety of formats, such as HTML, hand-held device markup language ("HDML"), wireless application protocol ("WAP"), or other format. For simplicity of discussion, HTML pages will be used for purposes of illustration only.

As will be described in detail below, aspects of the preferred embodiment pertain to specific method steps implementable on computer systems. In an alternative embodiment, the invention may be implemented as a computer program-product for use with a computer system. The programs defining the functions of the preferred embodiment can be delivered to a computer via a variety of signal-bearing media, which include, but are not limited to, (i) information stored on a non-writable storage medium (e.g., read-only memory ("ROM") devices within a computer such as a ROM or compact-disk ROM ("CD-ROM") readable by a CD-ROM drive); (ii) alterable information stored on writable storage media (e.g., floppy disks within a diskette drive or a hard-disk drive); or (iii) information conveyed to a computer by a communications medium, such as through a computer or telephone network, including wireless communications. Such signal-bearing media, when carrying computer-readable instructions that direct the functions of the present invention, represent alternative embodiments of the present invention.

FIG. 1 depicts a data processing system 100 in which the preferred embodiment may be implemented. In general, the data processing system 100 includes a client computer 122 and at least one server computer 124 (additional servers 124a-124n are shown). The client computer 122 and the server computer 124 may be components of the same computer system or may be separate components connected via a network 126, such as the Internet. The network may be a wire or cable directly electronically coupling the client to the server, or may include a wireless transmission portion, such as are used with cell phones and other "wireless" devices. Accordingly, it is understood that the client might include other components, such as a receiver and modem (i.e., "wireless modem").

The client computer 122 includes a Central Processing Unit ("CPU") 128 connected via a bus 130 to memory 132, storage 134, input device 136 and output device 138. The input device 136 can be any device to give input to the client computer 122. For example, a keyboard, keypad, light pen, touch screen, button, mouse, track ball or speech recognition unit could be used. The output device 138 is preferably any conventional display screen, such as liquid-crystal displays ("LCDs") or cathode-ray tubes ("CRTs") and, although showing separately from the input device 136, the output device 138 and input device 136 could be combined. The output device generally includes a viewable portion 139 that a user can read from. For example, a display screen with an integrated touch screen, and a display with an integrated keyboard, or a speech recognition unit combined with a text speech converter could be used.

While memory 132 is shown as a single entity, it should be understood that memory 132 may in fact comprise a plurality of modules, and that the memory 132 may exist at multiple levels, from high speed registers and caches to lower speed but larger DRAM and SRAM chips. The memory 132 contains a browser program 140 that, when executed on the CPU 128, provides support for navigating between the various servers 124, 124a-124n, for locating addresses at one or more of the servers, for entering date into data fields, and other functions, such as page rendering. The contents of memory 132 can be loaded from and stored to the storage 134 as CPU 128 has a need for it.

In one embodiment, storage 134 is non-volatile memory, such as non-volatile random access memory ("RAM"), flash memory, magnetic memory or optical storage. In some embodiments, it could be ordinary RAM. Although storage 134 is shown as a single unit, it could be any combination of fixed and/or removable storage devices, such as fixed disc drives, floppy disc drives, tape drives, removable memory cards or optical storage. Memory 132 and storage 134 could be part of one virtual address space spanning multiple primary and secondary storage devices. The storage 134 contains various data structures and, as shown in FIG. 1, storage 134 contains data files 141a, 141b, 141c (and possibly others). The data files store, among other data, user habit information and are used in rendering a page for display.

In a particular embodiment, a page renderer data file 141 has a datum entry if a particular type of datum or data is contained in other data files 141a, 141b, 141c. The other data files store user interaction habits for various types of user interactions with an electronic document. For example, a first data file 141a could be a table interaction file, a second data file 141b could be a link interaction file, and a third data file 141c could be a data entered interaction file. If a user interaction comprising a table interaction, a link interaction, or a data entry interaction occurs, the respective data file records information about the user interaction with the electronic document and provides an entry, i.e., a key, to a data field (see FIG. 2b, reference numeral 224) of the page renderer data file 141. The next time the user interacts with the electronic document, the page renderer data file initiates a page renderer process. Those skilled in the art will appreciate that these data files and their inter-relation are exemplary only. For example, the key could be generated during an evaluation step of a process (e.g., when a user interaction is evaluated to determine if it belongs to a type relating to page rendering), or concurrently with the creation of an entry for the interaction data file.

Each server computer 124 generally comprises a CPU 142, memory 144, and storage 146 to one another by a bus 148. It is understood that this block diagram is simplified for purposes of illustration, and that the actual server components might be physically separated, and that the server might include other components, such as displays and input devices, which are not shown. The memory 144 includes random access memory and/or other writable memory sufficiently large to hold the necessary programming and data structures that are located on the server computer 124 according to a network information address, e.g., a URL.

As shown, the memory 144 includes a hyper-text transfer protocol ("HTTP") server process 145 adapted to service requests from the client computer 122 regarding HTML documents, which can be called from storage and/or memory, and example of which is the electronic document 147 in memory 144. The HTTP server process 145 is merely illustrative and other protocols known and unknown in the art are contemplated by embodiments of the invention. The programming and data structures may be accessed and executed by the CPU 142 as needed. The storage 146 is provided for long-term storage of implementation code and data needed during operation. Although a specific hardware configuration is shown for data processing system 100, embodiments of the present invention include any hardware configuration that allows the browsing of documents, regardless of whether the computer system is a complicated, multi-user computing apparatus, a single-user workstation, or a network appliance that does not have non-volatile storage of its own.

FIG. 2a is a simplified flow chart of a browser process 200 that occurs as a user operates the browser. The process starts (step 202) by launching the browser program (FIG. 1, reference numeral 140). During operation, the user initiates various actions, or the browser calls actions, or the browser program or external programs (e.g., server program(s)) (step 204) may provide actions. For purposes of illustration, such actions will be called "events." For example, an event might be to render a page downloaded from a server or stored in the memory of the client. The browser then determines (step 206) if the event is to render a page. If so, the browser proceeds to a page renderer process at step 208. If the event is something other than to render a page, the browser continues in its execution and handles the event (step 210) before returning to the get the next event.

Figure 2B:
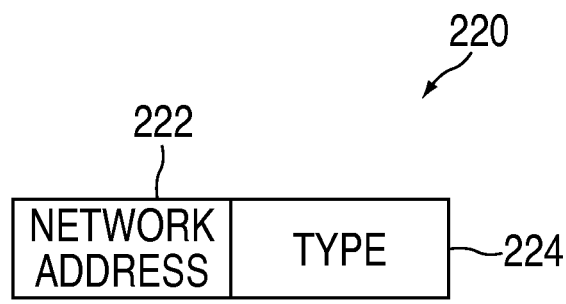
FIG. 2b is a simplified representation of a page renderer file.

FIG. 2b is a simplified representation of a page renderer file 220 that is used in a page renderer process. The page renderer file is stored as a data file, for example data file 141 shown in FIG. 1. The page render file includes a network address 222 for an electronic document and a type 224. For purposes of discussion, the electronic document will be referred to as a "page." The type represents a type of previous user interaction with the electronic document that invokes the page renderer process to present the document on a display according to user habits of interacting with the document.

Figure 3:
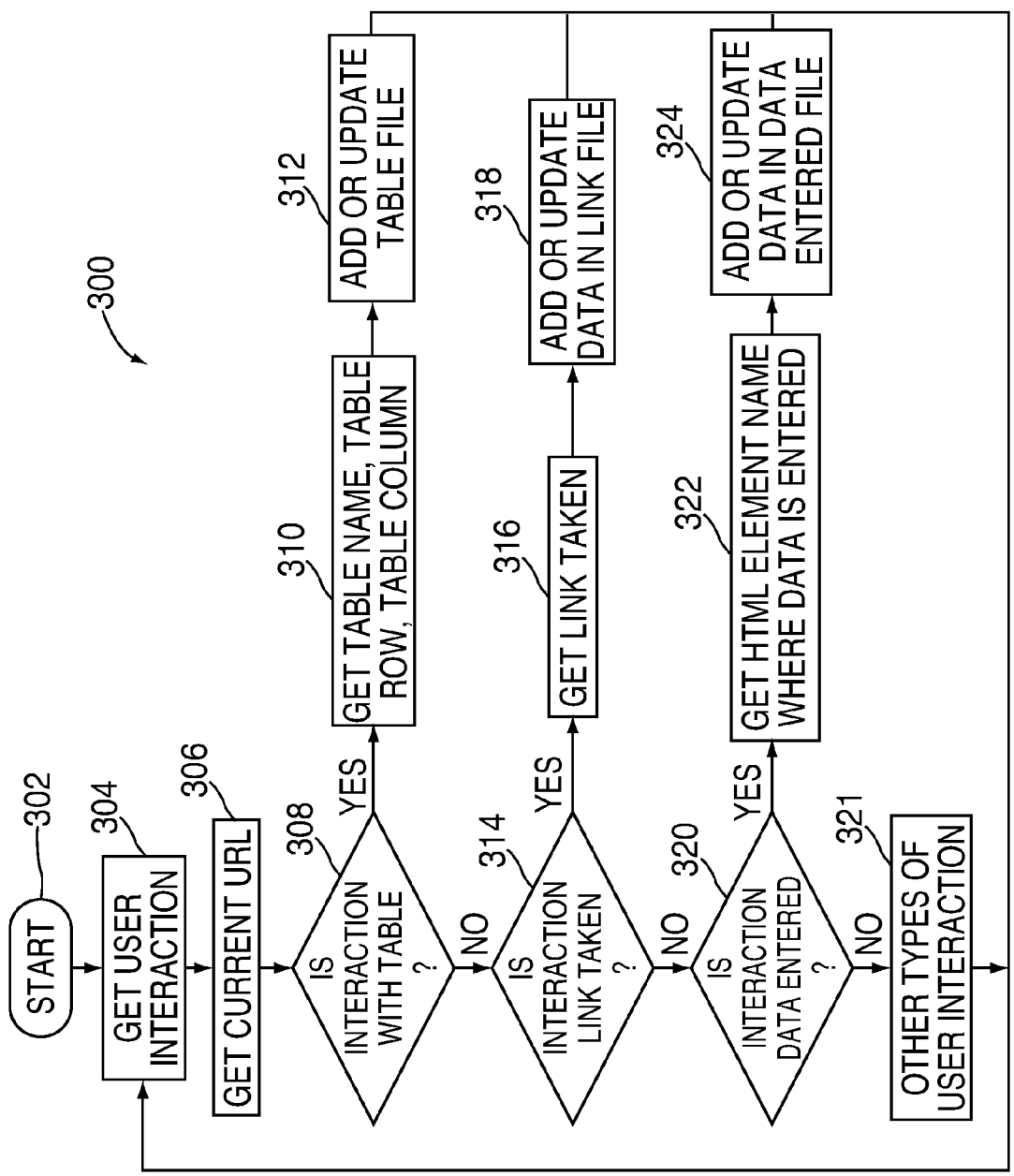
FIG. 3 is a simplified flow chart of a process to store data for user habits with a page.

FIG. 3 is a simplified flow chart of a computer program process 300 to store user interaction habits with a page. The process starts (step 302) when a user interacts with a currently displayed page. The user can interact with pages in a variety of fashions, such as to scroll the page vertically or horizontally, to scroll through a table in the page, to enter data into a data entry field on the page, or to select a link on the page, among other actions. The process gets the user interaction (step 304) and the network address, e.g., URL, associated with the page being displayed (step 306). Getting the URL provides correlation information for entry into the page renderer file.

The process 300 then determines which type of user interaction has occurred. For purposes of illustration, the first determination (step 308) is whether the user is interacting with a table. If the answer is YES, then the process gets the table name, table row, and table column (step 310). With the information received from step 310, the process then adds or updates data in the table renderer file (step 312). The table renderer file may contain entries relating to the URL, the table name, the table row, the table column, and a count indicating user activity or user habits on the page, for example. After updating or adding data in the table renderer file (step 312), the process 300 returns to get another user interaction (step 304), if any.

If the user has not yet interacted with the page, the process adds an entry to the table renderer file if the user interaction is a type the process records for page rendering purposes. Updating occurs if there are already entries in the table renderer file prior to the present user interaction. Incrementing a count associated with each page and type of user interaction is one way the table renderer file is updated. Thus, the count represents how many times the user has interacted with a location on a displayed page over a period of time, i.e., the user's interaction habits. The count field might fill up eventually, or might represent stale user habit data. Thus, the count field may have additional attributes, such as when the user interaction occurred. Another program, running in the background, for example, could keep the count representative of current user habits by degrading the count over time.

If, at step 308, the user interaction is not with a table, then the process 300 determines if the user is interacting with a link (step 314). If the user interaction is with a link, then the process gets the link taken (step 316) and adds to or updates the link file (step 318) with entries for the network address, the link taken, and an associated count for that link on that page. After adding to or updating the data in the link renderer file, the process returns to the get another user interaction (step 304), if any.

If the user interaction was not to take a link from the displayed page, then the process 300 proceeds to determine if the user interaction was to enter data (step 320). If the user entered data, then the process gets page field information, such as the HTML element name, where the user entered data (step 322) and adds to or updates data in a data entered renderer file (step 324). The data entered renderer file may contain, for example, the network address, page element name associated with the data entry field, and a count. After adding or updating the data in the data entered renderer file, the process 300 returns to get another user interaction (step 304), if any.

If the user interaction was not to enter data, then the process 300 could proceed to further decision nodes with similar branching operations for other types of user interaction(s) 321. For example, a user might simply scroll down or across a page, and the process might record how many rows or columns are scrolled. After the types of entries have been evaluated, the process returns to get the next user interaction (step 304), if any.

Figure 4A:
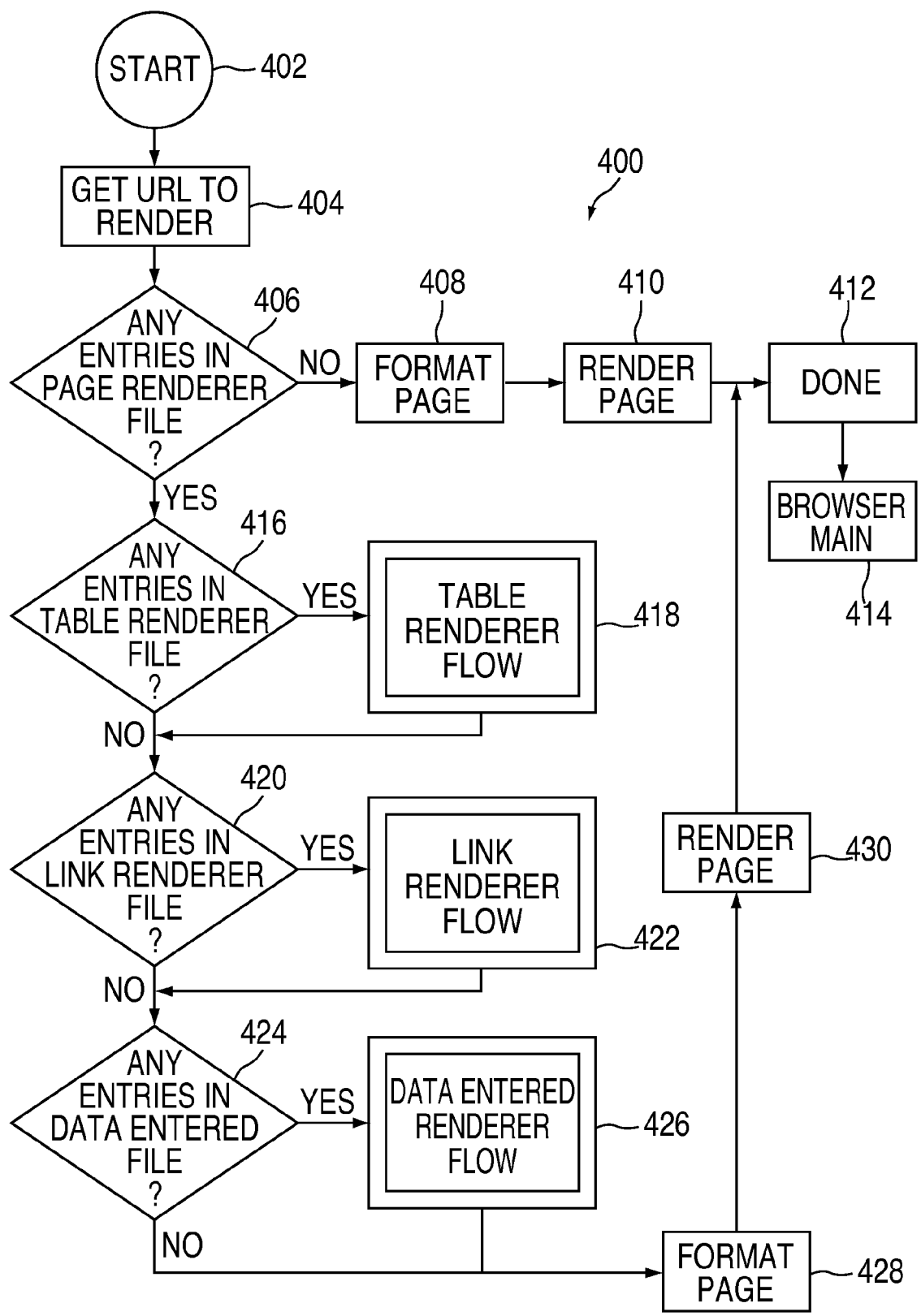
FIG. 4a is a simplified flow chart of a page renderer process using page alteration.

FIG. 4a is a simplified flow chart of a page renderer process 400 according to an embodiment of the present invention. This page renderer process alters a page display according to user habits. Referring briefly again to FIG. 2a, step 206, if the browser encounters an event that invokes page rendering, the page renderer process 400 is started (step 402). The page renderer process gets the network address (step 404), such as a URL, of the page to be rendered and evaluates whether there are any entries in the page renderer file (step 406). If there are no entries in the page renderer file, the page is formatted (step 408) and rendered (step 410), after which the page renderer process is done (step 412), and returns to the main browser program (step 414).

There would not be an entry in the page renderer file, for example, if the user had not previously visited the page, or if he had previously visited the page but had not further interacted with the page, or if he had previously interacted with the page, but not in a way that would create an entry in the page renderer file for that page. If there is an entry for that page in the page renderer file, the page renderer process 400 proceeds to determine the type of entry. In a particular embodiment, the page renderer file has an entry (i.e., key or TRUE flag) if any one of a specific type of user interaction has previously occurred with that page. One of skill in the art will recognize that the order shown is exemplary only, and other orders of decisions and related actions could be taken. Additionally, other types of entries (user interactions) could be made, which would have additional associated process flows.

Referring again briefly to FIG. 1, the data files 141a, 141b, 141c, store page renderer information relating to user habits. The sum of the individual data files are collectively referred to as the "page renderer file" 141. If an entry is present in any of the data files that make up the page renderer file, then the page renderer process proceeds to step 416, which evaluates whether there is an entry in the table renderer file (e.g., reference numeral 141a in FIG. 1). If there is an entry in the table renderer file, then the page renderer process 400 proceeds to a table renderer process (step 418). After the table renderer process is complete or if there is no entry in the table renderer file, the page renderer process 400 proceeds to the next step 420.

At step 420, the page renderer process 400 evaluates whether there is an entry in a link renderer file (e.g., reference numeral 141b in FIG. 1). If there is an entry in the link renderer file, then the page renderer process proceeds to the link renderer process (step 422). After the link renderer process is complete or if there is no entry in the link renderer file, the page renderer process 400 proceeds to the next step 424.

At step 424, the page renderer process 400 evaluates whether there is an entry in a data entered file (e.g., reference numeral 141c in FIG. 1). If there is an entry in the data entered renderer file, then the page renderer process 400 proceeds to a table entered renderer process (step 426). After the data entered renderer process is complete, the page renderer process formats the page (step 428) and renders the page (step 430).

The steps of formatting and rendering the page may alter the page, such as by placing a particular line or lines of the document at the top of the page, may re-arrange elements of the page, such as lines of a table displayed on the page, may alter the page in a combination of ways, or otherwise put the page to the display according to the page renderer process 400. After formatting and rendering the page (steps 428 and 430), the page renderer process is done (step 412) and returns to the main browser program (step 414).

If there are entries in more than one renderer file, the process can be structured so that the last-evaluated entry is what determines page rendering. In other words, if there is a link taken entry and a data entered entry in the respective data files, the page is rendered to show the data entry field at the top of the displayed page because it is the last type of user interaction evaluated.

Figure 4B:
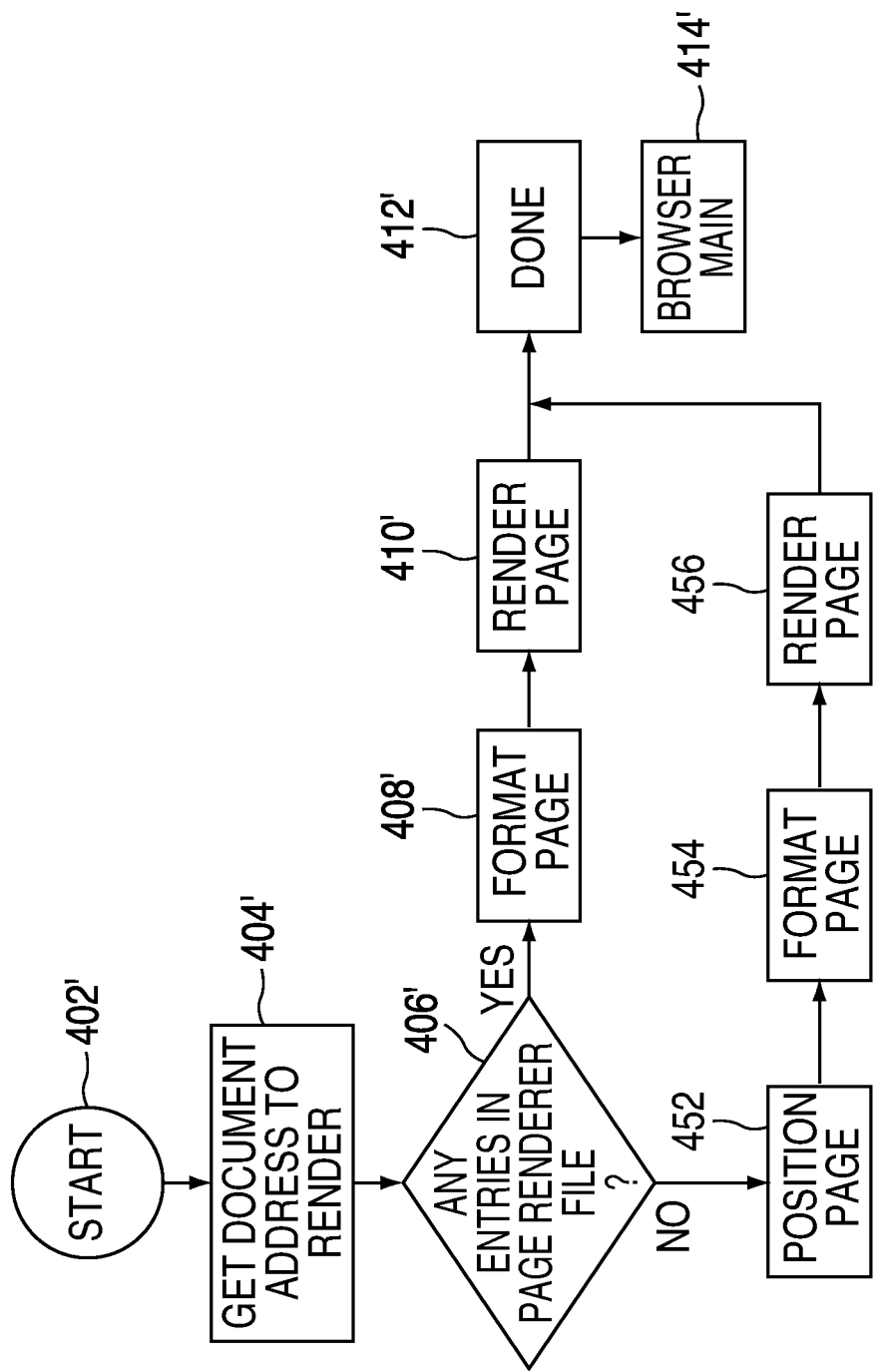
FIG. 4b is a simplified flow chart of a page renderer process using page positioning.

FIG. 4b is a simplified flow chart of a page renderer process 450 according to another embodiment of the present invention. This page renderer process positions a page on a display according to user habits. Referring briefly again to FIG. 2a, step 206, if the browser encounters an event that invokes page rendering, the page renderer process 450 starts (step 402'). The page renderer process 450 gets the network address (step 404'), such as a URL, of the page to be rendered and evaluates whether there is an entry in the page renderer file (step 406'), which would indicate a user had previously interacted with that page in a particular fashion. If there is no entry, the page is formatted (step 408') and rendered (step 410') to the display. The page renderer process is then done (step 412') and the page renderer process 450 returns to the main browser program (step 414').

If there is an entry in the page renderer file, then the page renderer process continues to a page positioning step 452. Those skilled in the art will appreciate that the decision node 406' of FIG. 4b and 406 of FIG. 4a could be combined, with an additional branch being added to the decision node depending on the type of page rendering desired according to the user interaction type. Similarly, the processes might share common steps, such as standard formatting 408, 408' and rendering 410, 410', for example.

The page positioning step 452 recalls user-habit page positioning data which could be stored in the page renderer file or another data structure, such as a page positioning data file. For example, if the user, after loading the page, scrolls the page to view a particular region of the page, a page positioning data file stores a page element or elements associated with the viewed page.

The region of the page that the user views typically depends on the display size and page size. An entry in the page renderer file counts, for example, how many times the user has scrolled to a particular position (generally indicated by the top displayed line) on a particular page, which would provide a user interaction field in the entry for the page renderer file. Thus, different counts are associated with the times the user has scrolled to different lines of the page. The user interaction position on the electronic document is determined by the number of lines scrolled or by HTML elements, for example. Such data provides user interaction field data to locate a position of an electronic document with which the user has interacted.

The page positioning step 452 selects the entry in the page renderer file with the highest count, and provides page positioning information for formatting (step 454) and rendering (step 456) the page. The page positioning information includes information such as a number or lines to be scrolled from an initial position, HTML elements associated with a line or lines of the page (such as line breaks), or similar information that directs the process to re-position the displayed page so that the user views the line he has most often scrolled to.

The operation of the process shown in FIG. 4b is different from the operation of the process shown in FIG. 4a in that the displayed page is not re-arranged in the process of 4b, but merely positioned so that the most interacted with portion of the page is shown at or near the top of the display, thus reducing or eliminating the need to scroll to that location on the page. It is specifically understood that the processes illustrated in FIGS. 4a and 4b could be combined. For example, the process 400 shown in FIG. 4a can re-arrange a table, and the process 450 shown in FIG. 4b can place the re-arranged table at the top of the displayed page.

User interaction with a displayed page may change the page according to conventional browser operation, such as when the user scrolls the page or enters data. The present invention, in comparison, stores data relating to user interaction habits and renders a page according to those habits the next time the user visits that page. In other words, while the user is interacting with a displayed page, the present invention is gathering statistics.

Figure 5A:
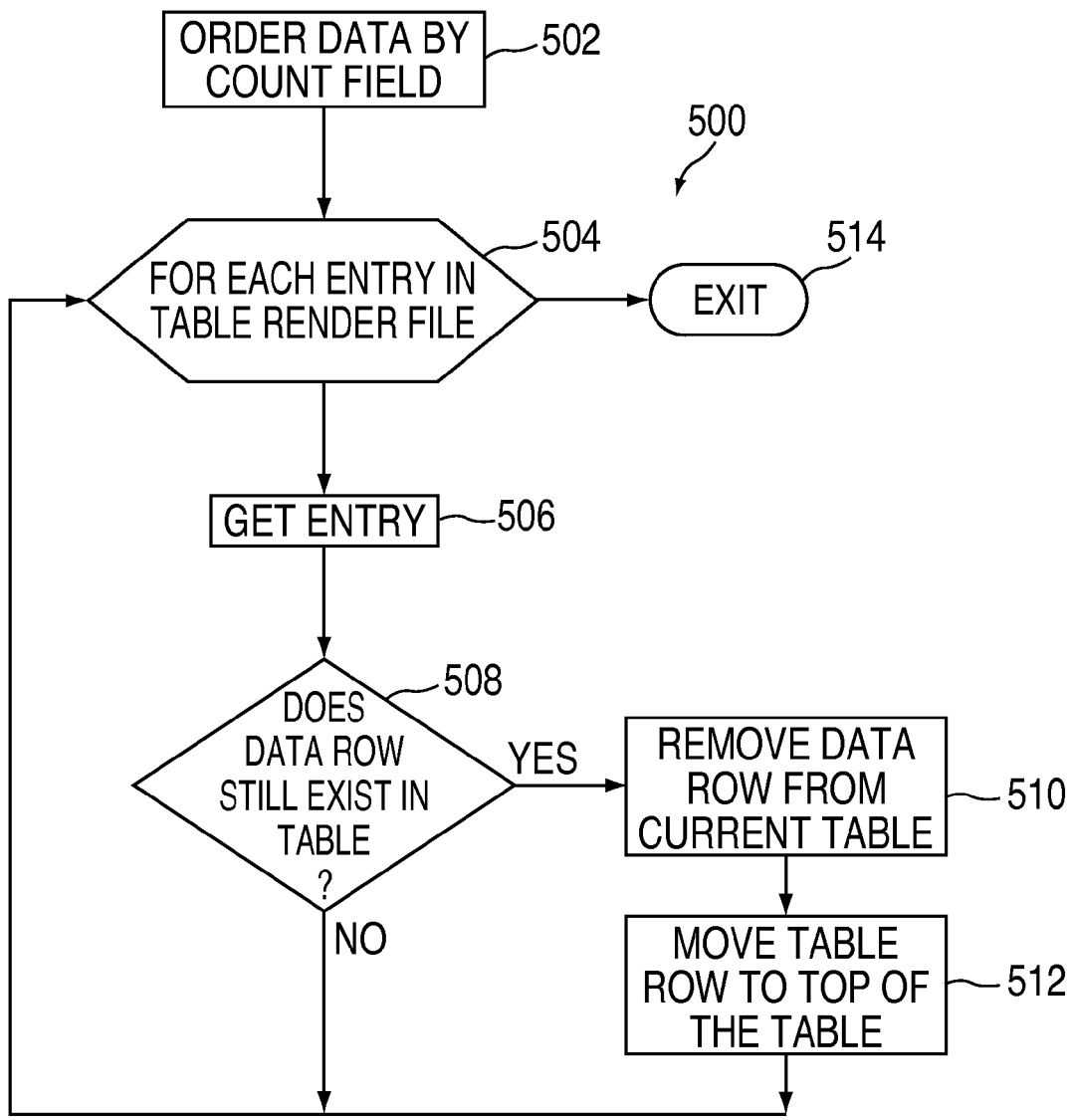
FIG. 5a is a simplified flow chart of an embodiment of a table renderer process.

FIG. 5a is a simplified flow chart of a table renderer process 500 illustrating one embodiment of step 418 of FIG. 4a. The table renderer process 500 orders the data in the table renderer file by the count field ("count") (step 502). The count identifies the row of the table the user has interacted with the most. For each entry in the table renderer file (step 504), the table renderer process gets the entry (i.e., the stored prior user interaction and associated URL) (step 506). The table renderer process 500 evaluates (step 508) whether the requested page still contains (would display) the table row that is stored in the table renderer file. If the row does not still exist in the table, then the table renderer process returns to get the next entry in the table renderer file and does not change how the page will be displayed. If the data row still exists in the table, the table renderer process removes the data row from its current table position (step 510) and moves the table row to the top of the table (step 512), additionally, the table row can be positioned at the top of the requested page. After processing the last entry in the table render file, the process 500 is exited at step 514.

In a particular embodiment, the table renderer process 500 arranges the entries in the table renderer file so that the lowest count is at the "top" of the file list (i.e., the first-evaluated entry) and the highest count is at the bottom of the list. In this fashion, as the table renderer process evaluates the entries in the table renderer file, the entry with the highest count is evaluated last, thus displaying the table row with the highest count at the top of the table. Prior entries would be temporarily positioned at the top of the table, but the ultimate top row of the table would reflect the highest count.

Figure 5B:
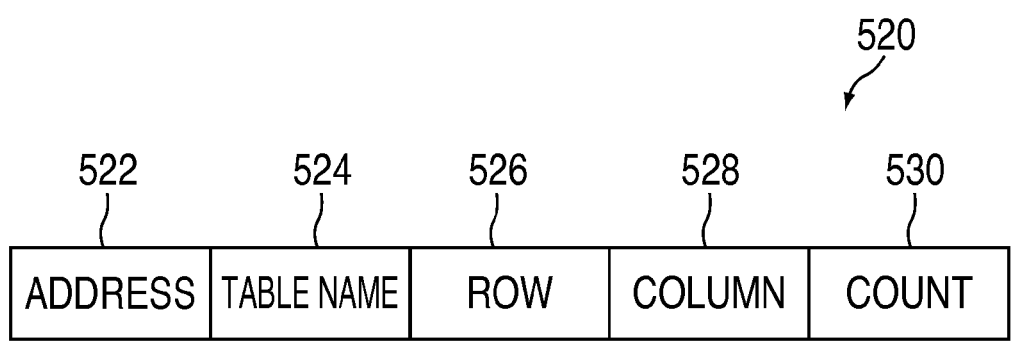
FIG. 5b is a simplified representation of a data structure of a table file entry.

FIG. 5b is a simplified representation of a data structure of a table renderer file entry 520. The data structure includes a network address 522, a table name 524, a row 526 of the table, a column 528 of the table, and a count 530. The row and column entries provide user interaction fields to associate a position of the electronic document with the user interaction. The table renderer file could include other fields, such a time field representing how long a user stays on a row of the table.

FIGS. 6a-6c are simplified representations of tables displayed on a user's display illustrating operation of an embodiment of the present invention. FIG. 6a is a simplified example of a table that might be displayed on an HTML page. All entries in the table could be selectable to link the table entry with the stock name, chart of stock price, and recent news, for example. The entries in the table are one type of page element, as are links, data entry fields, and line breaks, among others. A page is typically made up of several elements that the user can interact with in various ways. The user might enter data into a field, take a link, or scroll to a particular position on the page, the position being defined according to page elements such as a line number.

For purposes of discussion, it is assumed that the display could not show the entire table, but rather that the display can show only four lines of the table. However, the present invention also applies to situations where the entire table can be shown on a display. For example, even though the display can show the entire table, it may be desirable to have the highest-count row displayed at the top of the table, or to have a requested page rendered so that the display shows the most-requested line of the page at the top of the display. It is further assumed that the user is interested in linking to information relating to HWP and INTC, and visits these links frequently by scrolling to them and selecting the links, and that the user never interacts with the row relating to JMAR. With conventional browsers, the user would typically scroll down the page to find the table, at which point only the first four lines would be displayed (i.e., IBM, JMAR, SUNW, and VCAI). The user would typically then have to continue scrolling if he wanted to view the row containing HWP, for example.

FIG. 6b shows the lines that would be on the client's display when the user subsequently requests the page containing the table. A browser according to an embodiment of the present invention renders the page to display the previously visited information in a selected arrangement. First, the browser displays the page at a point showing the table. Second, the browser re-arranges the table to display the rows having information on HWP and INTC at the top of the table. FIG. 6c shows the lines that the browser would not display, including JMAR, which has dropped to the bottom row of the table. The user could scroll the page down to view these rows of the table, if desired. Similarly, the invention can re-arrange other items on a page, such as links, images, or headlines.

Furthermore, the browser could track the overall time spent by the user at various points of a URL and initially position the client display to show the part of the URL that the user has spent the most time on. Such time data could decide row or other entry priority if the counts for two rows are the same, for example.

Figure 7A:
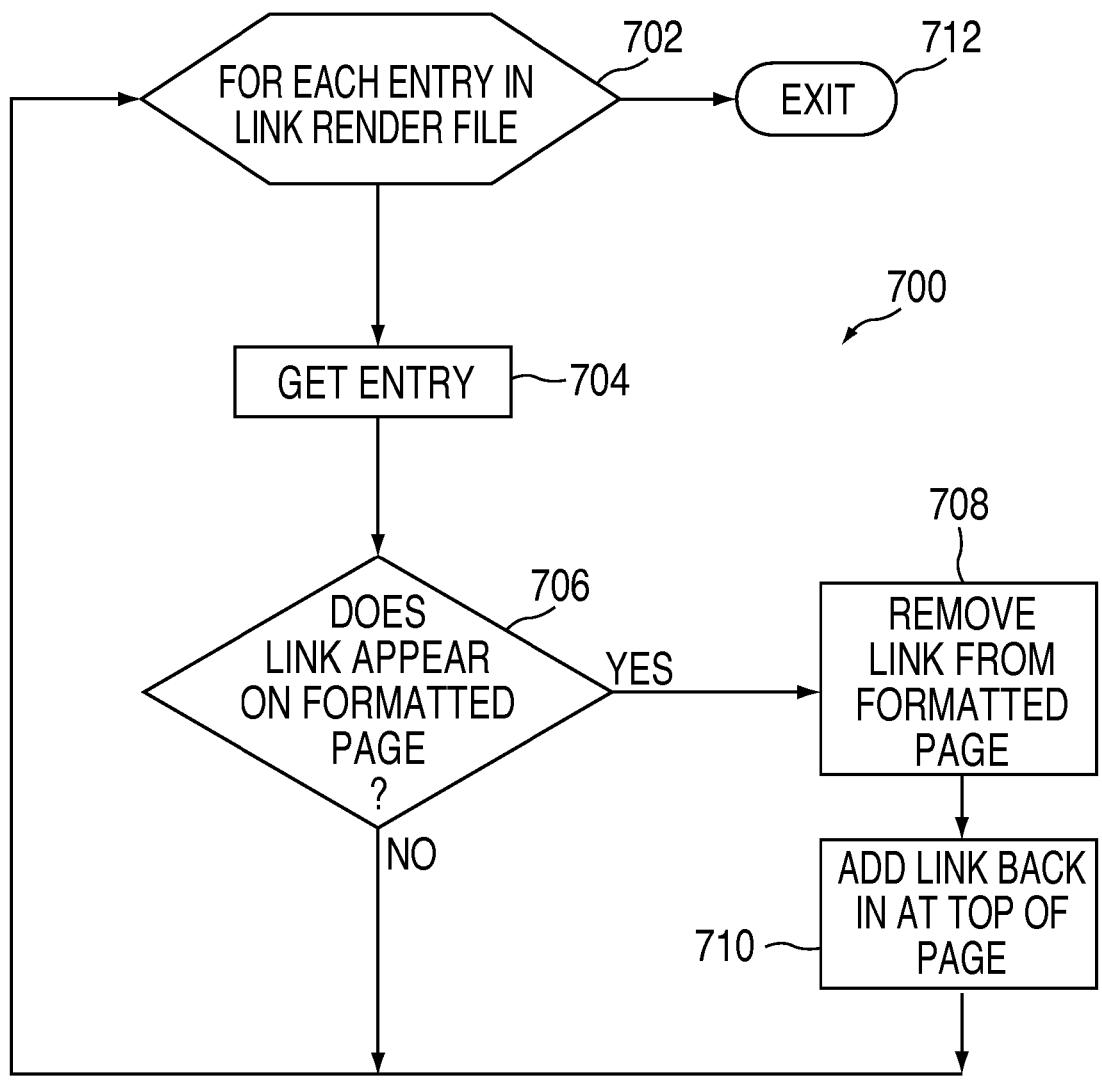
FIG. 7a is a simplified flow chart of an embodiment of a link renderer process.

FIG. 7a is a simplified flow chart of a link renderer process 700 showing one embodiment of step 422 of FIG. 4a. The page renderer process 400 of FIG. 4a invokes the link renderer process 700 when the user selects a page and the link renderer file has an entry associated with that page. The link renderer process 700 evaluates each entry in the link renderer file (step 702) by getting an entry (step 704) and evaluating if the page still displays the link associated with the entry (step 706).

If the link does not still exist on the page, then the link renderer process 700 returns to get the next entry in the link renderer file, and does not re-arrange the display field (i.e., portion of the displayed page) or re-position the page. If the link still exists on the page, the link renderer process removes the link from its current position (step 708) and moves the link to the top of the displayed page (step 710). After processing the last entry in the link render file, the process 700 exits at step 712.

Figure 7B:
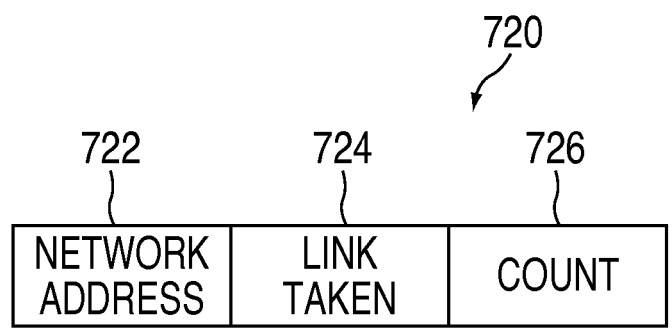
FIG. 7b is a simplified representation of a data structure of a link-taken file entry.

FIG. 7b is a simplified representation of a data structure of a link-taken file entry 720. The entry includes a network address 722 associated with the page on which the link occurred when the user interacted with the link, the link taken by the user 724, and a count 726.

Figure 8A:
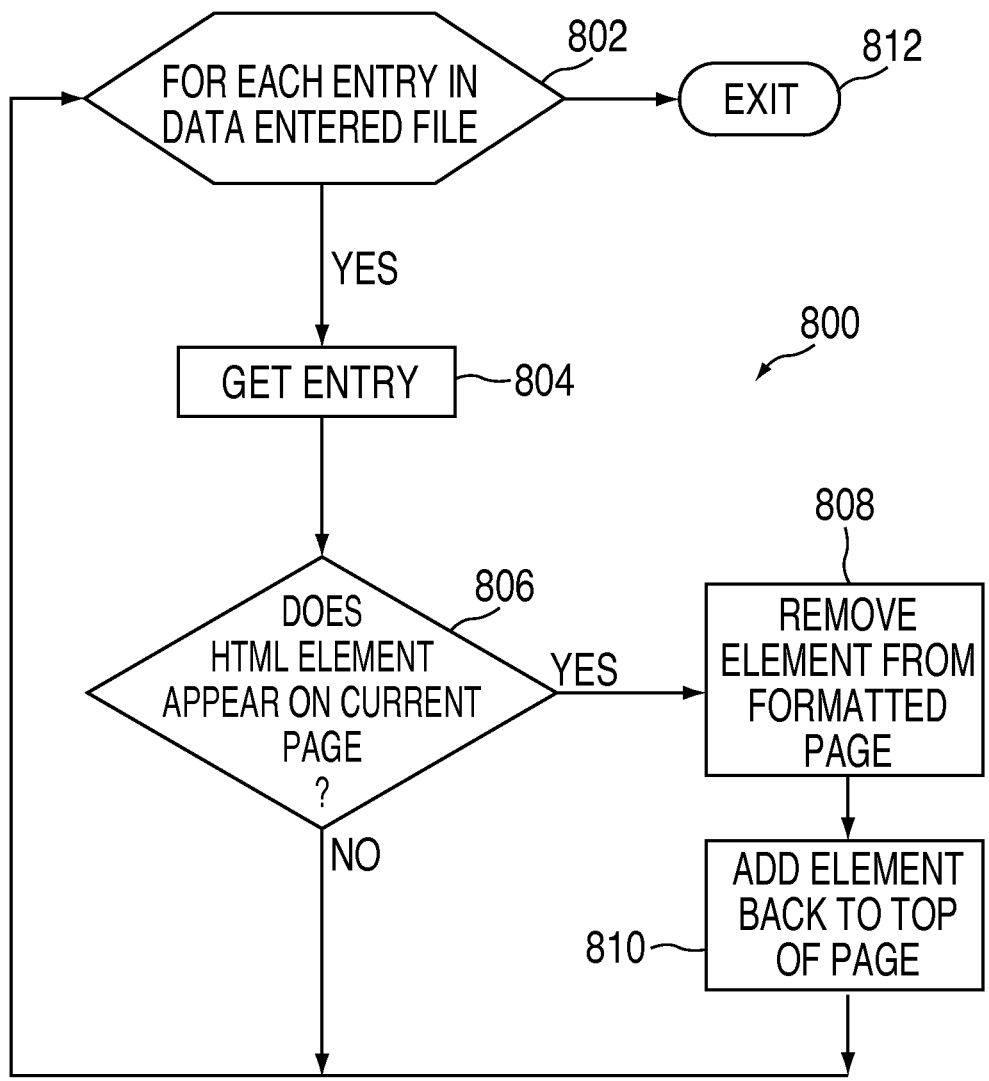
FIG. 8a is a simplified flow chart of an embodiment of a data-entered process.

FIG. 8a is simplified flow chart of a data entered renderer process 800 showing one embodiment of step 426 of FIG. 4a. The page renderer process 400 of FIG. 4a invokes the data entered renderer process 800 when a user selects a page and the data entered renderer file has an entry associated with that page. The data entered renderer process 800 evaluates each entry (step 802) in the data entered renderer file by getting an entry (step 804) and evaluating if a data entry field, such as an HTML element, associated with the entry still appears on the current (requested) page (step 806).

Figure 8B:
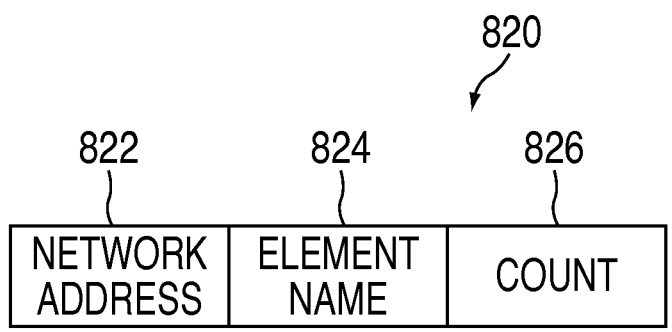
FIG. 8b is a simplified representation of a data structure of a data-entered file entry.

If the data entry field does not still exist on the page, then the data entered renderer process 800 returns to get the next entry in the data entered renderer file, and does not re-arrange the displayed page. If the data entry field still exists on the page, then the data entered renderer process removes the data entry field from its position on the formatted page (step 808) and moves the data entry field to the top of the page (step 810). After processing the last entry in the data entered file, the process 800 exits at step 812. FIG. 8b is a simplified representation of a data structure of a data-entered file entry 820. The data-entered file entry includes a network address 822, a data entry field identifier, such as an HTML element name, 824 and a count 826. While the present invention has been described with respect to the preferred and alternative embodiments, it will be understood by those skilled in the art that various changes in detail may be made therein without departing from the spirit, scope, and teaching of the invention. For example, in a further embodiment, each of the renderer processes could include a device query step to determine the number of lines available for display and further modify the rendering of the displayed page. In yet a further embodiment, the display resolution could be stored for use in the page rendering process as part of the as-provided client. Accordingly, the herein disclosed invention is to be limited only as specified in the following claims.

What is claimed is:

1. A client computer for use in a networked system, the computer comprising:
   a display having a viewable area; and
   browsing and rendering software configured to at least:
      display a browser window in the display, the browser window containing a scroll bar,
      receive prompts from a user to access pages having network addresses located on server computers of the networked system, the pages each having a displayable size exceeding the viewable area of the display and a default layout; and
      when prompted by the user to access a given page at a specified network address:
         retrieve the given page from the specified network address on the respective server computer;
         access user interaction data located on the client computer and associated with the specified network address, the user interaction data describing previous user interaction with an element of the given page via the browser; and
         render the given page to the browser window in the display by repositioning the given page according to the user interaction data from a default position so that the element is moved into the viewable area of the display and wherein, after the given page is rendered, the scroll bar is positioned to allow the user to scroll the given page upwards to bring a top portion of the given page from an unviewable position into the viewable area of the display, and wherein the default layout of the given page is maintained while being scrolled.

2. The computer of claim 1, wherein the browsing and rendering software repositions the element to a page location at a top position of the display.

3. The computer of claim 1, wherein the element of a given page is selected from the group consisting of a table, a link, a data entry field, and a scroll bar.

4. The computer of claim 1, wherein accessing user interaction data further comprises:
   getting a first user interaction with the element of the given page;
   determining if the first user interaction is a first user interaction type; and
   if the first user interaction is the first user interaction type:
      getting at least an electronic document element datum associated with the first user interaction, and
      storing the electronic document element datum; and
   storing a first count associated with the electronic document element datum, wherein the count represents a number of user interactions of the first user interaction type with the element of the given page.

5. The computer of claim 4, wherein the first user interaction type is selected from the group consisting of interaction with a table, interaction with a link, interaction with a data entry field, and scrolling.

6. The computer of claim 4, further comprising steps, after storing the first count, of:
   getting a second user interaction with a different element of the given page;
   determining if the second user interaction is the first user interaction type;
   if the second user interaction is not the first user interaction type:
      evaluating if the second user interaction is a second user interaction type; and
   if the second user interaction is the second user interaction type:
      getting at least a second electronic document element datum associated with the second user interaction;

storing the second electronic document element datum; and incrementing a second count associated with the second electronic document element datum, wherein the second count represents a number of user interactions of the second user interaction type with the different element of the given page.

7. The computer of claim 4, further comprising steps, after storing the first count, of:

getting a second user interaction with a different element of the given page;

determining if the second user interaction is the first user interaction type; and if the second user interaction is the first user interaction type of user interaction:

getting at least a second electronic document element datum associated with the second user interaction;

storing the second electronic document element datum; and incrementing a second count associated with the second electronic document element datum, wherein the second count represents a number of user interactions of the first user interaction type with the different element of the given page.

8. The computer of claim 7, wherein repositioning the given page according to the user interaction data further comprises determining a greater count value as between a value of the first count a value of the second count so that the element associated with the greater count value is moved into the viewable area of the display.

9. A method for using user interaction data on a client computer, the method comprising:

displaying a viewable area of a display using a browser having a scroll bar;

receiving a prompt from a user to access a page having a network address located on a server computer of the networked system, the page having a displayable size exceeding the viewable area of the display and a default layout; and after receiving the prompt by the user to access the page at a specified network address:

retrieving the page from the specified network address on the respective server computer, accessing user interaction data located on the client computer, the user interaction data describing previous user interaction with an element of the page, rendering the page to the display by repositioning the page according to the user interaction data so that the element is moved into the viewable area of the display and a top portion of the page is moved into an unviewable position, and responsive to user manipulation of the scroll bar after the page is rendered, scrolling the page upwards to bring the top portion of the page from the unviewable position into the viewable area of the display, and wherein the default layout of the given page is maintained while being scrolled.

10. The method of claim 9, wherein the element of a given page is selected from the group consisting of a table, a link, a data entry field, and a scroll bar.

11. The method of claim 9, wherein repositioning moves the element into a top position of the viewable area of the display.

12. The method of claim 9, wherein accessing user interaction data further comprises:

getting a first user interaction with the element of the page;

determining if the first user interaction is a first user interaction type; and if the first user interaction is the first user interaction type:

getting at least an electronic document element datum associated with the first user interaction, and storing the electronic document element datum; and storing a first count associated with the electronic document element datum, wherein the count represents a number of user interactions of the first user interaction type with the element of the page.

13. The method of claim 12, further comprising steps, after storing the first count, of:

getting a second user interaction with a different element of the page;

determining if the second user interaction is the first user interaction type; and if the second user interaction is the first user interaction type of user interaction:

getting at least a second electronic document element datum associated with the second user interaction;

storing the second electronic document element datum; and incrementing a second count associated with the second electronic document element datum, wherein the second count represents a number of user interactions of the first user interaction type with the different element of the page.

14. The method of claim 13, wherein repositioning the page according to the user interaction data further comprises determining a greater count value as between a value of the first count a value of the second count so that the element associated with the greater count value is moved into the viewable area of the display.

15. A method for using user interaction data on a client computer, the method comprising:

displaying a viewable area of a display using a browser having a scroll bar;

receiving a prompt to access pages having network addresses located on server computers of the networked system, the pages each having a displayable size exceeding the viewable area of the display and a default layout; and after receiving the prompt to access a given page:

retrieving the page from the specified network address on the respective server computer, accessing user interaction data located on the client computer, the user interaction data describing previous user interaction with an element of the given page, rearranging the given page from the default layout to a rearranged layout according to the user interaction data, thereby creating a rearranged page which ensures that the element is placed in the viewable area of the display when the rearranged page is rendered, and wherein all content of the given page is contained in the rearranged page, and rendering the rearranged page to the display, wherein the element is in the viewable area of the display.

16. The method of claim 15, wherein the element of a given page is selected from the group consisting of a table, a link, a data entry field, and a scroll bar.

17. The method of claim 15, further comprising responsive to user manipulation of the scroll bar after the rearranged page is rendered, scrolling the rearranged page, and wherein the rearranged layout of the rearranged page is maintained while being scrolled.

18. The method of claim 15, wherein accessing user interaction data further comprises:

getting a first user interaction with the element of the given page;

determining if the first user interaction is a first user interaction type; and if the first user interaction is the first user interaction type:
- getting at least an electronic document element datum associated with the first user interaction, and
- storing the electronic document element datum; and
- storing a first count associated with the electronic document element datum, wherein the count represents a number of user interactions of the first user interaction type with the element of the given page.

19. The method of claim 18, further comprising steps, after storing the first count, of:

getting a second user interaction with a different element of the given page;

determining if the second user interaction is the first user interaction type; and if the second user interaction is the first user interaction type of user interaction:
- getting at least a second electronic document element datum associated with the second user interaction;
- storing the second electronic document element datum; and incrementing a second count associated with the second electronic document element datum, wherein the second count represents a number of user interactions of the first user interaction type with the different element of the given page.

20. The method of claim 19, wherein rearranging the given page from the default layout to the rearranged layout according to the user interaction data further comprises determining a greater count value as between a value of the first count a value of the second count so that the element associated with the greater count value is moved into the viewable area of the display.

* * * * *